(12) United States Patent
Bonicatto et al.

(10) Patent No.: US 7,877,218 B2
(45) Date of Patent: Jan. 25, 2011

(54) SIGNAL OUTAGE DETECTION

(75) Inventors: Damian Bonicatto, Pequot Lakes, MN (US); Chad Wolter, Breezy Point, MN (US); Verne Olson, Pequot Lakes, MN (US)

(73) Assignee: Hunt Technologies, Inc., Atlanta, GA (US)

( * ) Notice: Subject to any disclaimer, the term of this patent is extended or adjusted under 35 U.S.C. 154(b) by 359 days.

(21) Appl. No.: 12/041,349

(22) Filed: Mar. 3, 2008

(65) Prior Publication Data
US 2008/0215268 A1 Sep. 4, 2008

Related U.S. Application Data

(60) Provisional application No. 60/892,335, filed on Mar. 1, 2007.

(51) Int. Cl.
  *G01R 13/00* (2006.01)
  *G06F 19/00* (2006.01)
(52) U.S. Cl. .................. 702/66; 702/181; 702/188; 702/189; 375/224
(58) Field of Classification Search ............ 702/66–68, 702/86, 181–199
See application file for complete search history.

(56) References Cited

U.S. PATENT DOCUMENTS

| 5,786,951 | A | * | 7/1998 | Welland et al. | ............... | 360/46 |
| 6,622,006 | B1 | * | 9/2003 | Wang et al. | ............... | 455/12.1 |
| 7,277,573 | B1 | | 10/2007 | O'Brien | | |
| 2002/0081977 | A1 | | 6/2002 | McCune | | |

OTHER PUBLICATIONS

International Search Report and Written Opinion for PCT/US08/55675, mail date Jul. 25, 2008.

* cited by examiner

*Primary Examiner*—Andrew Schechter
*Assistant Examiner*—Phuong Huynh
(74) *Attorney, Agent, or Firm*—Thomas, Kayden, Horstemeyer & Risley, LLP

(57) ABSTRACT

Disclosed are various embodiments for outage detection. In one embodiment, an outage detection system includes a signal sampler configured to sample a signal on a communications link and to determine a noise level and a signal level of the sample. An outage detection system also includes a comparator configured to compare a critical value with a sum of signal and noise of the sample. An outage detection system further includes a binomial probability analyzer configured to calculate a binomial probability of false outage of the sample and the previous N samples.

21 Claims, 8 Drawing Sheets

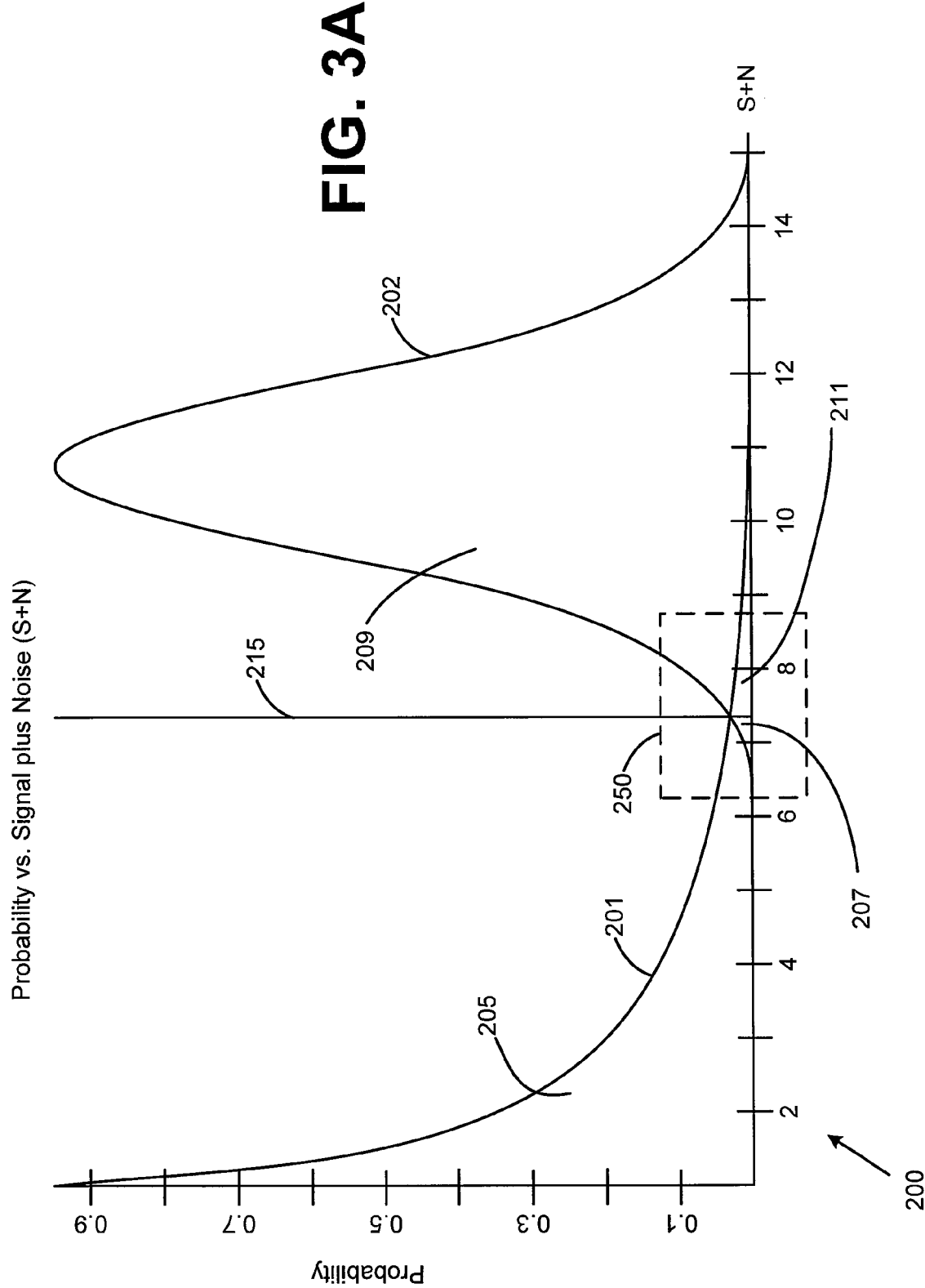

SIGNAL OUTAGE DETECTION

CROSS REFERENCE TO RELATED APPLICATION

This application claims priority to U.S. Provisional Application Ser. No. 60/892,335, filed Mar. 1, 2007, which is hereby incorporated by reference in its entirety.

TECHNICAL FIELD

The disclosure relates generally to a power distribution system, and more specifically, to communications over distribution line or communications link in a power distribution system.

BACKGROUND

In a power distribution system, usage metering data may be transmitted over a distribution line or a communications link to a power distribution substation, central office, billing center, or the like. Outage detection may require receipt or transmission of an entire packet of data. Consequently, outage detection may take an unacceptably long period of time due to the time necessary to transmit or receive a packet of data.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 3A depicts a graph illustrating probability distributions of outage and restore;

DETAILED DESCRIPTION

Figure 1:
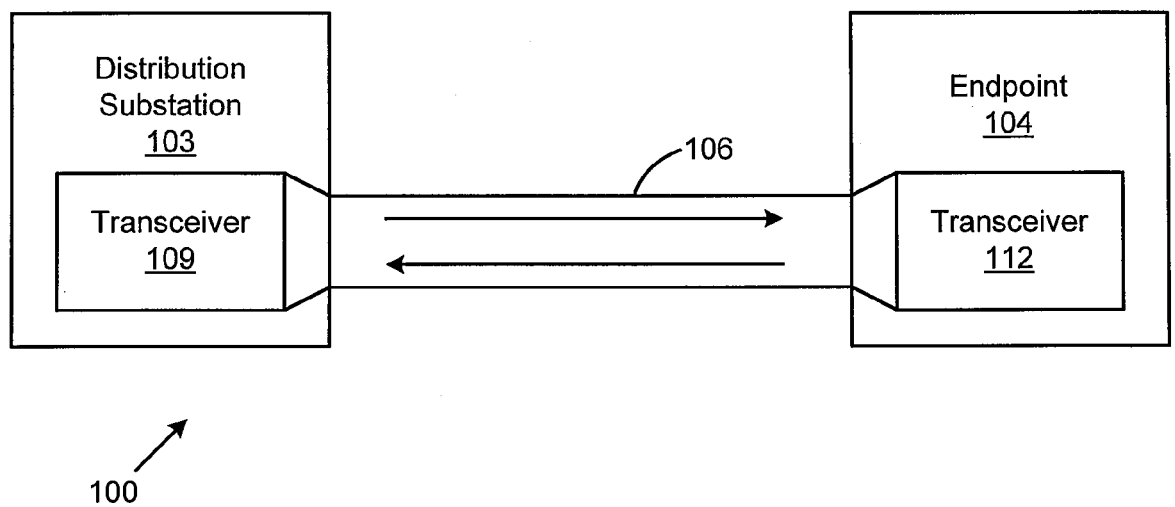
FIG. 1 depicts a distribution substation and an endpoint according to an embodiment of the disclosure.

With reference to FIG. 1, shown is a block diagram of one link of an exemplary electrical distribution system 100 distributing power between a distribution substation 103 and an endpoint 104, which can be incorporated with a customer device or electrical system at a power consumer's premises or site. An electrical distribution system 100, or distribution plant as it is sometimes referred to, is that part of an electric power system that receives power from a power generator via high-voltage transmission lines, reduces or steps down the voltage, and then distributes the power to an endpoint 104 at the premises of an energy customer. Within the electrical distribution system 100, distribution lines may conduct electricity from the distribution substation to the endpoints. Distribution lines may include underground cable, aerial cable, or overhead open-wire conductors carried on poles, or some combination of them.

There may be one or more layers of distribution substations 103 connected in series between the power generation and the endpoint 104, where each consecutive distribution substation further steps down the voltage of the electricity being transmitted. Additionally, the depicted distribution substation 103 can also represent any other central office, data center, and/or other supplier infrastructure used to deliver electricity, telecommunications services, phone, internet, or other services as should be appreciated. As a non-limiting example, the depicted distribution substation 103 can be replaced with a digital subscriber line access multiplexer (DSLAM) implemented in accordance with the same or analogous principles as disclosed herein.

Additionally, the power generators, distribution substations, and endpoints may be organized in a network where various generators supplying power can be taken on or off line and the distribution substation through which a particular endpoint receives its electricity can be changed, all without a loss or interruption of power. Distribution transformers (not shown) may be connected in the distribution line between the distribution substation 103 and the endpoint 104, which the distribution transformers serve to further step-down the voltage to a level that is used by consumers. These step-down transformers, often referred to as pole transformers, supply a consumer or group of consumers over a secondary circuit. Each consumer is connected to the secondary circuit through its service leads and meter.

The distribution substation 103 shown in FIG. 1 may be configured to provide power to a customer device (not shown) or endpoint 104 via a communications link 106, which can also be referred to as a distribution line. The communications link 106 may be coupled to one or more step-down transformers before reaching the depicted endpoint 104. The communications link 106 may be configured to provide power from the distribution substation 103 to the endpoint 104. For a variety of reasons, it may be desirable to communicate information from the distribution substation 103 to one or more endpoints, such as an endpoint 104. As a non-limiting example, it may be desirable to control or monitor a usage metering device, which may be located at or near the endpoint 104 to determine the power consumption at the endpoint 104. Additionally, control information could provide the ability to control or alter the operation of such an exemplary usage metering device and/or individual loads at the customer premise. As an additional non-limiting example, other services aside from power, such as telecommunications, internet, and/or other data services can also be provided via the distribution line and may utilize bidirectional communication between the distribution substation 103 and endpoint 104.

Other more general information, including, but not limited to, information to display or store the price of power at the customer premise, the date and time, the temperature and/or other information capable of being received and translated at the customer premise may also be transmitted along the distribution line. For example, the time displayed on an electronic device at the customer premise could be periodically adjusted to display an accurate time as transmitted by the utility station.

Various embodiments disclosed herein may be configured to communicate control signals and general information signals to endpoints 104 via the communications link 106 to control customer devices and provide more general information to the customer. Information from the customer device also may be sent via the communications link 106 to the distribution substation 103, thereby creating a two-way or bidirectional communications link via the distribution line 106. The aforementioned examples of control signal applications where control signals (and/or general information signals) are provided by the distribution substation to an endpoint 104 are merely representative of the various uses that such control signals provide. Therefore, the examples provided throughout the application are merely exemplary, as the invention is not limited to the transmission of any particular signal or service.

In order to provide control information at the distribution substation 103, a substation transceiver 109 is used to drive the control signals along the communications link 106 to an endpoint transceiver 112 at the endpoint 104. The endpoint transceiver 112 is configured to recognize the signals transmitted by the substation transceiver 109. Similarly, the substation transceiver 109 receives information transmitted on the communications link 106 from the endpoint transceiver 112.

The electrical distribution system 100 including the communications link 106 and depicted in FIG. 1 therefore, may be configured to provide a full-duplex or bi-directional link between the distribution substation 103 and the endpoint 104. Full duplex in this non-limiting example may refer to simultaneous (and/or substantially simultaneous) communications in both directions, although the information sent in one direction may travel at a speed different from that of the information provided in the opposite direction. This full-duplex link via the communications link 106 may be configured to provide for transmission of control information, without the need for additional wiring over and above such wiring that is necessary for the transmission of electrical power.

It should be appreciated that the depicted electrical distribution system 100 of FIG. 1 is merely a depiction of a single exemplary link in such a system. It should further be appreciated that additional complexities necessary for the bulk distribution of electricity or other services can be incorporated into an embodiment of the present disclosure.

Figure 2:
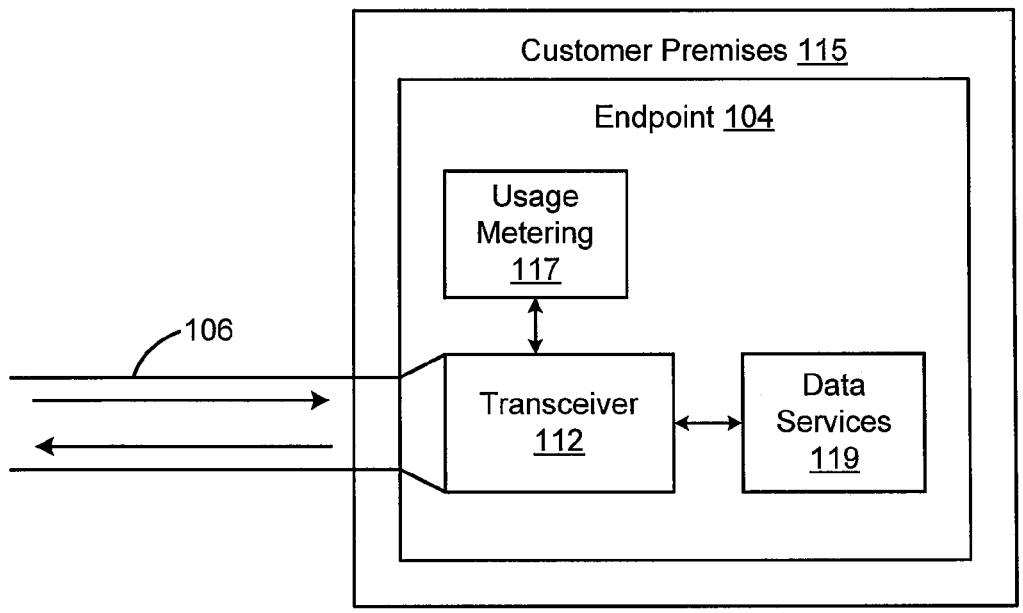
FIG. 2 depicts another exemplary embodiment of an endpoint.

With reference to FIG. 2, shown is an alternative depiction of an endpoint 104 in accordance with the disclosure. The depicted endpoint 104 can, for example, be installed at a customer premises 115 and be configured to deliver power over a distribution line. As a non-limiting example, the distribution line or communications link 106 can deliver power for consumption by the consumer as well as other data services 119 via the endpoint transceiver 112. It should be appreciated that usage by a customer of electricity or other services may be metered so that the customer can be appropriately billed or charged according to such usage by various loads or other electrical devices at the customer premises 115. Accordingly, a usage metering device 117 can be coupled to the endpoint 104 for the purposes of tracking or metering such usage and transmitting usage data via the communications link 106 to a substation, central office, and/or billing center. Similarly, usage metering device 117 can be coupled to endpoint transceiver 104 to deliver power consumption data to a substation transceiver and/or other devices configured to receive such data for billing and/or other purposes.

Figure 3B:
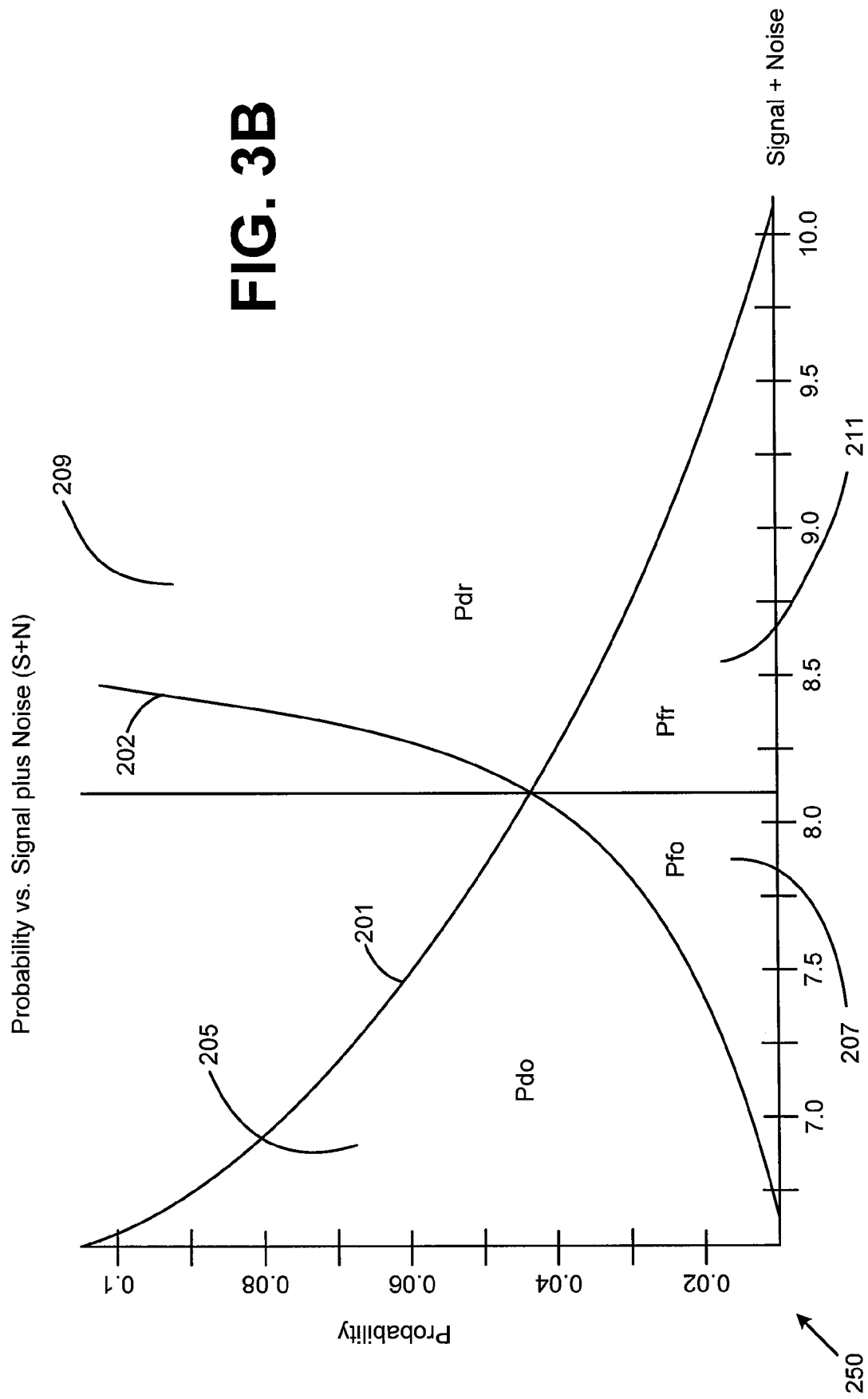
FIG. 3B depicts an alternative graph illustrating probability distributions of outage and restore.

Reference is now made to FIGS. 3A and 3B, which depicts exemplary graphs 200 and 250 that express a probability of detecting a signal outage as well as a probability of detecting signal presence in a system such as those depicted in FIGS. 1 and 2. The depicted graphs are not to scale and are not intended to limit the disclosure, but are merely illustrative of the concepts disclosed herein. It should also be noted that in at least one non-limiting example, a provider of electricity via communications link 106 may determine whether data such as usage metering data, is being received from an endpoint 104 (FIG. 1). In other words, may be configured to determine whether an endpoint 104 is properly transmitting and a distribution substation 103 (FIG. 1) is properly receiving data. The above noted probabilities are expressed in the graph 200 as the areas under the depicted curves. As illustrated in FIG. 2, these curves are plotted against the observed or measured sum of signal and noise, or amplitude, that is detected on a communications link or distribution line. It should be appreciated that the amplitude can also be referred to as an amount of energy observed on the distribution line or communications link 106.

The graph depicts two curves that can each be separated into at least two regions. The region underneath channel noise floor curve 201 represents a probability that an outage exists, and the region underneath endpoint transmit curve 202 represents a probability that a signal presence, or a "good" link between an exemplary endpoint 104 (FIG. 1) and distribution substation 103 (FIG. 1) can be detected by observing signal and noise levels. The region underneath endpoint transmit curve 202 may also be referred to as a probability of detecting a restore. Each of the curves are plotted against the sum of signal and noise, and it should be appreciated that, generally speaking, as a signal to noise ratio increases, the greater the likelihood that there is signal presence.

Additionally, as noted above, the area underneath channel noise floor curve 201 can be separated into two regions. Region 205 of the graph represents a probability of successfully detecting a signal outage by examining signal and noise levels measured on the communications link 106 (also referred to as Pdo). It should be appreciated that, generally speaking, the lower a measured signal to noise ratio, the greater the probability that there exists an outage on the communications link 106, or, in other words, the greater the probability that an endpoint 104 (FIG. 1) and a distribution substation 103 (FIG. 1) are unable to communicate with one another.

In the non-limiting example of FIG. 2, region 207 falls within a region of overlap between the endpoint transmit curve 202 and channel noise floor curve 201. Because of this overlap, it is indeterminate whether observing signal and noise levels falling within the range spanned by region 207 corresponds to the probability of detecting an outage or restore. Accordingly, region 207 can be identified as a probability of a false outage detection, or Pfo, as the region 207 falls within the probability of an outage detection as well as the probability of signal presence.

The endpoint transmit curve 202 can likewise be separated into two regions. Region 209 of the graph represents a probability of successfully detecting a signal presence by examining a sum of signal levels and noise levels measured on a communications link (referred to as Pdr). Region 211 falls within a region of overlap between the endpoint transmit curve 202 and channel noise floor curve 201. Because of this overlap, it is indeterminate whether observing signal and noise levels falling within the range spanned by region 211 correspond to the probability of detecting an outage or restore. Accordingly, region 211 can be identified as the probability of a false signal presence, false restore, or Pfr, as the region 211 falls within the probability of an outage detection as well as the probability of signal presence.

Signal and noise levels corresponding to the intersection of endpoint transmit curve 202 and channel noise floor curve 201 may also correspond to a critical value 215. The critical value 215, aside from regions 209 and 211, may be the sum of signal and noise which corresponds equally to a probability of detecting an outage and a probability of detecting signal presence. Accordingly, upon examining communications link 106, a rough measure of whether there is an outage or restore can be based on whether the measured signal and noise levels are less than or greater than, respectively, this critical value 215.

However, while region 207 falls within the range of signal presence curve 202, it may also correspond to signal and noise levels that are less than the critical value 215. Accordingly, identifying a measured signal and noise levels within the range of region 207 as an outage may result in a false outage detection. Accordingly, as noted above, region 207 may correspond to a probability of false outage detection. Similarly, while region 211 falls within the range of the outage curve 201, it likewise may correspond to signal and noise levels that are greater than the critical value 215. Accordingly, identifying measured signal and noise levels that are greater than the critical value 215 but within the range of region 211 may result in a false signal detection.

Figure 4:
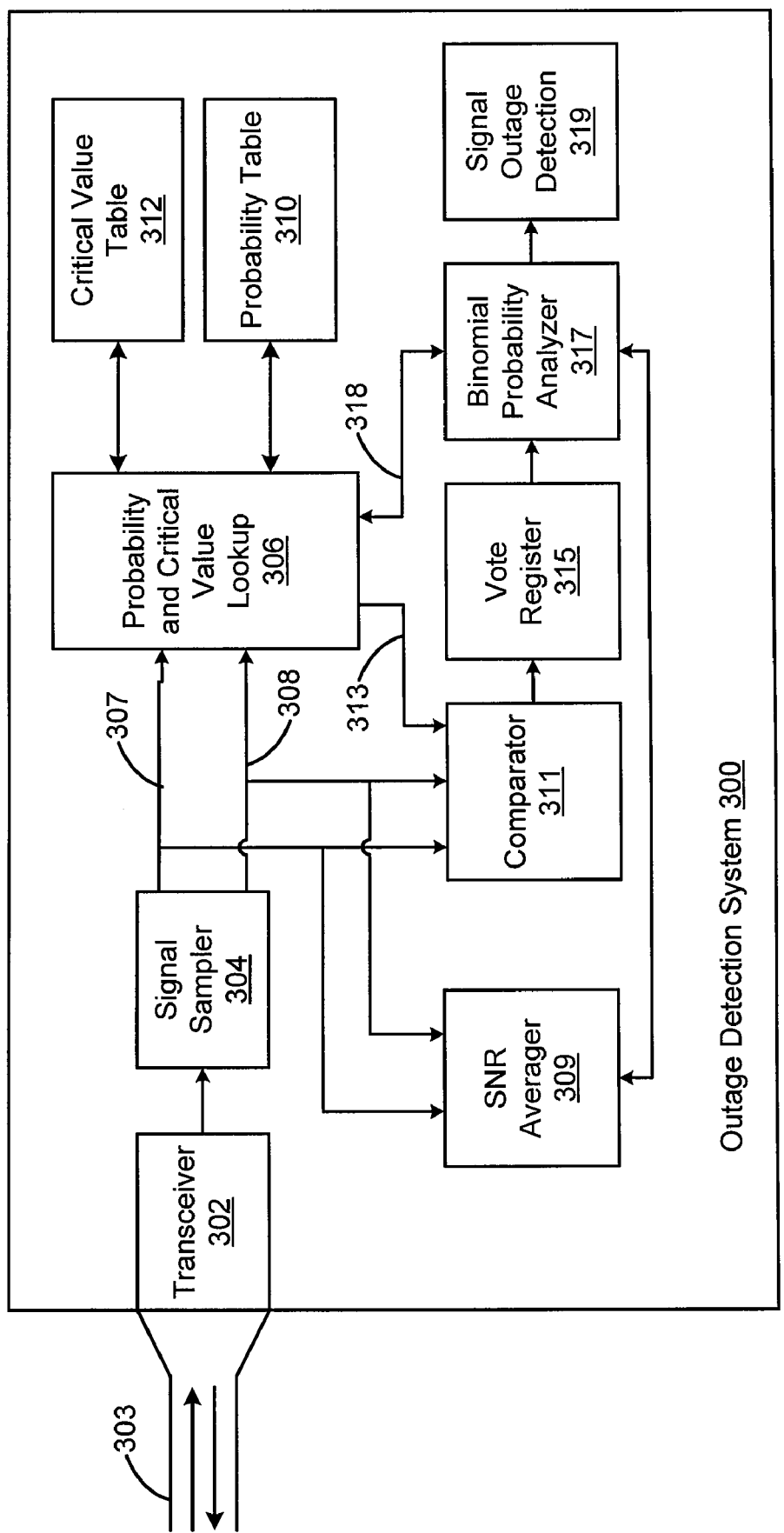
FIG. 4 depicts an exemplary embodiment of an outage detection system in accordance with the disclosure.

With reference to FIG. 4, shown is one example of an outage detection system 300 in accordance with the disclosure. The depicted outage detection system can be incorporated into the endpoint 104 (FIG. 1) or the distribution substation 103 (FIG. 1). An outage detection system 300 is configured to detect whether there is an outage or restore on a communications link 106 by sampling the signal level and noise level on the communications link 106. The outage detection system 300 may also determine whether there is a signal presence or outage by employing binomial statistical methods. The depicted outage detection system 300 includes a transceiver 302 coupled to a communications link 303 (also referred to as a distribution line). The transceiver 302 may be configured to send and/or receive signals transmitted to or from a counterpart transceiver, such as, for example, an endpoint transmitting usage metering data including information regarding power consumption at a customer premises.

The transceiver 302 may further be coupled to signal sampler 304, which may be configured to sample electrical signals received by the transceiver 302 for the purposes of determining an outage or restore. The signal sampler 304 may further be configured to sample electrical signals received by the receiver 302 at predetermined intervals. For example, depending on the transmission speed of the transceiver 302 and communications link 303 coupled thereto, the signal sampler 304 can be configured to sample a signal separated by a predetermined period of time chosen to yield a diverse set of data that takes into account various properties of the distribution line for statistical calculations used for determining an outage or restore. As a non-limiting example, the power distribution line 303 and transceiver 302 configured to communicate data thereon at approximately one bit and/or symbol every one thousand two hundred seconds to two thousand four hundred seconds. The signal sampler 304 can be configured to sample communications link 303 every one hundred fifty seconds.

In this way, in the above example, because the predetermined period of time is less than the amount of time required to send a single bit and/or symbol, an outage or a restore may be detected without waiting for the receipt or transmission of an entire packet of data that require transmission and examination of the entire packet. The signal sampler 304 may further be configured to analyze the signal and noise levels observed on communications link 303 for the purposes of statistical analysis. Accordingly, the signal sampler 304 may be coupled to probability and critical value lookup 306, which takes as inputs signal level 307 as well as the noise level 308 observed on communications link 303 for the purposes of calculating and/or retrieving the above noted critical value and probabilities (Pdo, Pfo, Pdr, and Pfr) associated with the signal level 307 and noise level 308.

It should be appreciated that scaled critical values and the above noted probabilities may be stored in a critical value table 312 and a probability table 310, respectively. Rather than calculating critical values and/or probabilities within the system 300 based upon its inputs, values based on field data associated with the transceiver 302, communications link 303, and/or other factors, can be calculated and stored within the critical value table 312 and the probability table 310, which can reduce computational complexity associated with determining an outage or restore. This can be particularly important in order to save processing resources in an embedded system or a digital signal processor architecture.

A SNR Averager 309 may be configured to receive the signal level 307 and the noise level 308 associated with samples from the signal sampler 304, and can maintain a running average of signal to noise ratio associated with samples taken on the communications link 303. The SNR Averager 309 can also calculate and/or maintain a running average of a predetermined number of samples retrieved by signal sampler 304. Similarly, SNR Averager 309 can calculate an average signal to noise ratio for any number of samples for which analysis by the outage detection system 300 is required.

A comparator 311 is coupled to signal sampler 304 as well as probability and critical value lookup 306 in order to compare the observed signal levels 307 and the noise levels 308 of a sampled signal with a critical value 313 retrieved from the probability and critical value lookup 306. For example, the comparator 311 can compare the sum of signal level 307 and noise level 308 with a critical value 313. Depending on the value of the observed sum of signal level 307 and noise level 308 in comparison to the critical value 313, the comparator 311 can output a value associated with an outage or restore to vote register 315. For example, if the observed sum of signal level 307 and noise level 308 is less than critical value 313, the comparator can output a value associated with an outage in the form of logical "0." Alternatively, if the observed sum of signal level 307 and noise level 308 is greater than the critical value 313, the comparator can output a value associated with a restore in the form of a logical "1." As noted above, the value of the measured sum of signal 307 and noise 308 in comparison to the critical value 313 can give a rough measure of whether there is an outage or a restore in a system such as a power distribution system. This can also be referred to as an outage hypothesis. However, as also noted above, because there may exist probabilities of false signal detection or false outage, this rough measure may result in an incorrect outage or restore detection.

Additionally a vote register 315 may be coupled to the comparator 311 and configured to maintain a history of results output by the comparator 311 so that the statistical probability of whether there is an outage or signal presence can be calculated by the system. The vote register 315 can be configured to maintain any number of samples for an accurate and thorough statistical evaluation of the votes stored therein. As a non-limiting example, in a power distribution system, the vote register 315 can be configured to store twenty-one values corresponding to a comparison computed by comparator 311. Additionally, vote register 315 can be configured to output the total number of samples stored therein as well as whether the majority of values stored therein correspond to an outage or a restore. The vote register 315 may also be configured to only consider or analyze only the even or odd samples in determining the total number of samples and/or whether the majority of values correspond to an outage or a restore. Accordingly, the vote register 315 can output the above noted rough measure or outage hypothesis of whether there is an outage or restore in the system's ability to communicate with other systems on the communications link.

Vote register 315 is coupled to binomial probability analyzer 317, which may be configured to analyze the probability of whether the rough measure is correct or incorrect. By computing the binomial probability of several successive votes within the vote register 315, the system can improve the likelihood of correctly determining an outage or a restore by analyzing the relationship of a plurality of samples to a critical value rather than analyzing only a single sample. Additionally, the binomial probability analyzer 317 can determine the probability of a plurality of samples resulting in a false or a correct detection of an outage or a restore.

Accordingly, the binomial probability analyzer 317 can calculate the binomial probability corresponding to the above noted probabilities Pdo, Pfo, Pdr, or Pfr for a series or plurality of samples taken by signal sampler 304. As a non-limiting example, the analyzer 317 can receive as an input whether the majority of votes stored within the vote register 315 correspond to an outage or a restore. Subsequently, depending on whether the majority of votes correspond to an outage or a restore, the binomial probability analyzer can calculate the appropriate probability. To make the appropriate calculations, the binomial probability analyzer 317 can retrieve probabilities from probability and critical value lookup 306 based on upon the measured signal to noise ratio of each sample for which a vote is stored in vote register 315 and/or based upon a running average signal to noise ratio calculated by the SNR Averager 309.

As a non-limiting example of binomial probability calculations, if the majority of votes on the vote register 315 correspond to an outage, the binomial probability analyzer can calculate the binomial probability of Pfo, or the probability of detecting a false outage that corresponds to a plurality of samples represented in the vote register 315. Additionally, the binomial probability analyzer 317 can also calculate the binomial probability of Pdo, Pdr, and Pfr. The resultant calculated binomial probability can be scaled according to an average signal to noise ratio associated with the samples being analyzed. As a non-limiting example, if the calculated binomial probability corresponds to the votes for the previous y samples, an average signal to noise ratio for the y samples can be provided by the signal to noise averager 309 to the binomial probability analyzer 317 for such scaling.

Accordingly, on the basis of one or more calculated binomial probabilities, signal outage detection 319 can determine whether there is a signal outage and/or a restore based upon one or more predefined statistical thresholds, which, as a non-limiting example, can be user specified. In other words, a signal outage and/or restore can be detected on the basis of a calculated binomial probability by comparing it to a predefined probability threshold. As another non-limiting example, a power distribution system operator can specify one or more maximum threshold probabilities that the operator is willing to accept that a false outage or a false restore is detected, and signal outage detection 319 can compare the calculated binomial probabilities generated by the binomial probability analyzer 317 against such specified probabilities. Similarly, an operator can specify a minimum threshold probability that the operator is willing to accept that an outage or restore is calculated, and signal outage detection 319 can receive, as an input, a probability of an outage and/or restore corresponding to a plurality of samples from the binomial probability analyzer.

Figure 5:
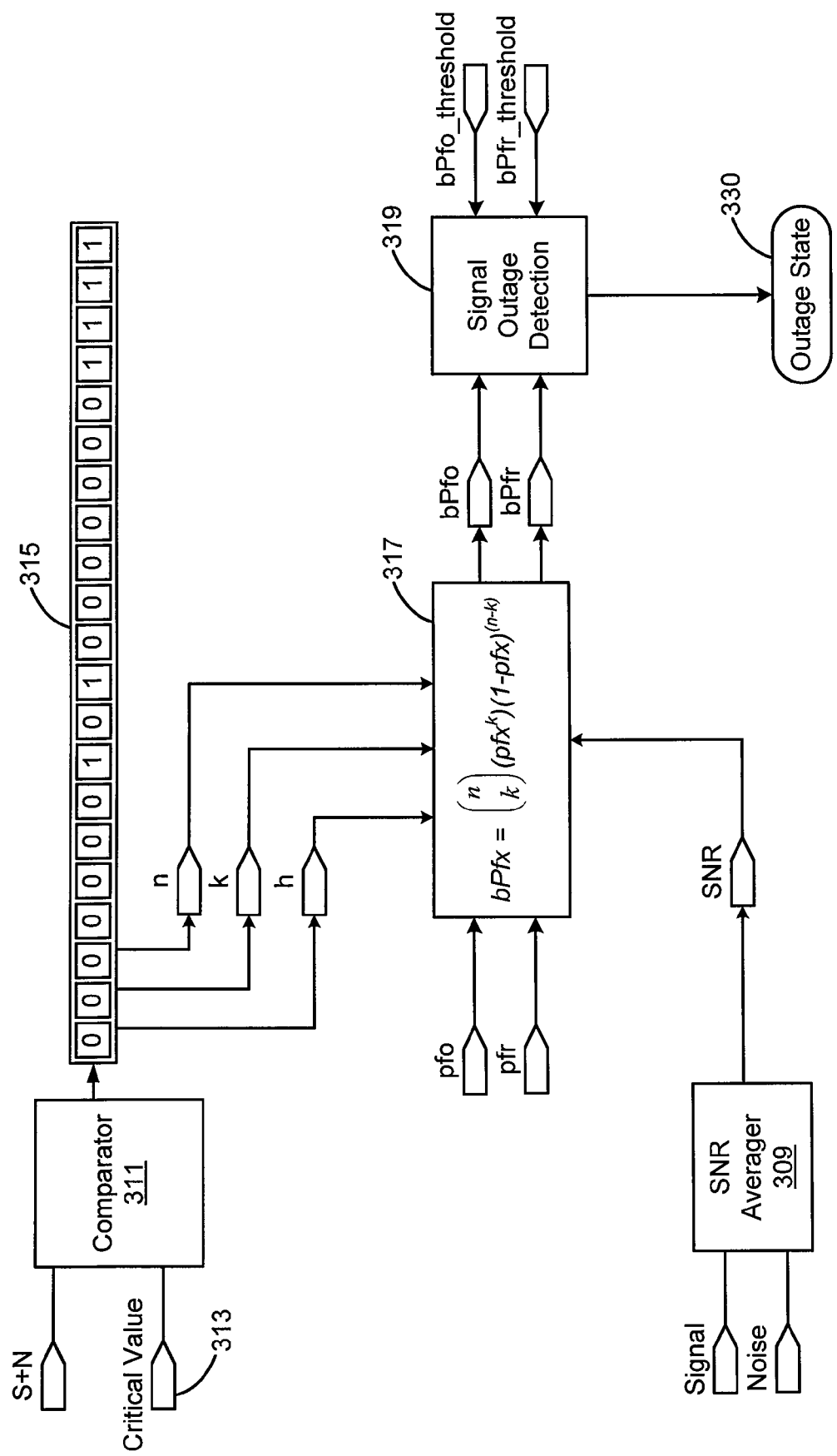
FIG. 5 depicts an exemplary embodiment of components of the outage detection system of FIG. 3.

Reference is now made to FIG. 5, which illustrates an additional depiction of one example of the SNR Averager 309 (FIG. 4), comparator 311 (FIG. 4), vote register 315 (FIG. 4), binomial probability analyzer 317 (FIG. 4), and signal outage detection 319 (FIG. 4) of the exemplary outage detection system 300. As noted above, comparator 311 may be configured to compare a sum of the measured signal level 307 and the noise level 308 to a critical value 313 to arrive at a rough measure as to whether a signal outage or restore can be detected by the system. Accordingly, if the sum of signal level 307 and noise level 308 is less than the critical value 313, comparator 311 causes the vote register 315 to store a value associated with an outage. In this non-limiting example, an outage is represented in the vote register 315 is associated with a vote value of logical zero. Similarly, if the sum of signal level 307 and noise level 308 is greater than the critical value 313, comparator 311 causes to vote register 315 to store a value associated with a restore, which is associated in the depiction with a vote value of logical one.

In at least one exemplary embodiment, vote register 315 can output at least three values, n, k, and h to binomial probability analyzer 317. The value n can represent the total number of samples being analyzed for which votes are registered in vote register 315. As noted above, in at least one non-limiting example, vote register 315 can be configured to analyze only even or odd samples stored therein and output n, k and h accordingly. As another non-limiting example, binomial probabilities may be calculated for fewer samples than are stored within the vote register 315. Accordingly, n, k, and h, can be output according to a subset of the vote values stored within the vote register 315. The value k can represent a count of the majority of the analyzed samples in vote register 315 that correspond to an outage or a restore. In the depicted example, if a majority of values in the vote register 315 correspond to an outage, then k is output as the number of the votes in the vote register 315 that correspond to an outage. Similarly, if a majority of values in the vote register 315 correspond to a restore, then k is output as the number of votes in the vote register 315 that correspond to a restore.

Further, vote register 315 can also output a Boolean value associated with an outage hypothesis, or h. As a non-limiting example, if a majority of values in the vote register 315 correspond to a restore, then h can be output with a value of one. Similarly, if a majority of values in the vote register 315 correspond to an outage, then h can be output with a value of zero. It should be appreciated that the vote register 315 can be implemented with varying numbering and hardware schemes, and that the above is but one example.

Binomial probability analyzer 317 may be configured to receive, as inputs, the above values n, k and h as well as one or more of the above noted probabilities associated with either an average measured signal to noise ratio of the samples and/or signal and noise levels associated with each sample. In the depicted example, the binomial probability analyzer 317 receives as inputs Pfo and Pfr associated with the running average measured signal to noise ratio.

Accordingly, binomial probability analyzer 317 calculates a binomial probability associated with the values n, k and h. In other words, the value h can represent an outage hypothesis and the binomial probability analyzer 317 can calculate the probability that the outage hypothesis is correct. As a non-limiting example, if vote register 315 outputs h having a value associated with a majority of samples representing an outage, then the outage hypothesis can be described as hypothesizing that there is a signal outage, and the binomial probability analyzer 317 can calculate the binomial probability of a false outage, or bPfo. The binomial probability of a false outage is calculated in this scenario because while the signal and noise levels associated with the analyzed samples are less than the critical value and can be roughly associated with an outage, there still exists a probability that the system is not in an outage state due to the overlap in the curves 201, 202 described in reference to FIG. 1.

Likewise, if vote register 315 outputs h having a value associated with a majority of samples representing a restore, and/or an outage hypothesis of a restore, then binomial probability analyzer 317 can calculate the binomial probability of such a hypothesis, or bPfr. Alternatively, rather than relying on an outage hypothesis, the binomial probability analyzer 317 can also calculate and output both probabilities bPfr and bPfo for comparison to determine whether there exists a signal outage or a signal restore. The binomial probability analyzer 317 can calculate the above noted probabilities by executing the depicted binomial probability function. However, it should be appreciated that varying formulas, equations, and/or functions can be implemented to arrive at such binomial probabilities. As a non-limiting example, one or more calculated binomial probabilities can be scaled by an average signal to noise ratio associated with the samples considered in the probability calculations.

One or more binomial probabilities can serve as inputs to signal outage detection 319, which can also receive predefined or user specified threshold probabilities, as noted above, to arrive at an outage state 330. As a non-limiting example, if an outage hypothesis represented by a h value is a restore state, then signal outage detection 319 can compare the calculated binomial probability bPfr associated with the outage hypothesis to a predefined or user specified probability threshold. If the calculated binomial probability is less than a predefined threshold, then signal outage detection 319 can specify an outage state 330 corresponding to a restore, or signal presence. Similarly, if the calculated binomial probability bPfo is less than a predefined threshold, then signal outage detection 319 can specify an outage state 330 corresponding to an outage. It should be appreciated that various permutations and/or combinations of outage hypotheses and binomial probabilities can be calculated and used to arrive at an outage state 330 in accordance with the present disclosure and that the above discussion discloses merely representative examples.

Figure 6A:
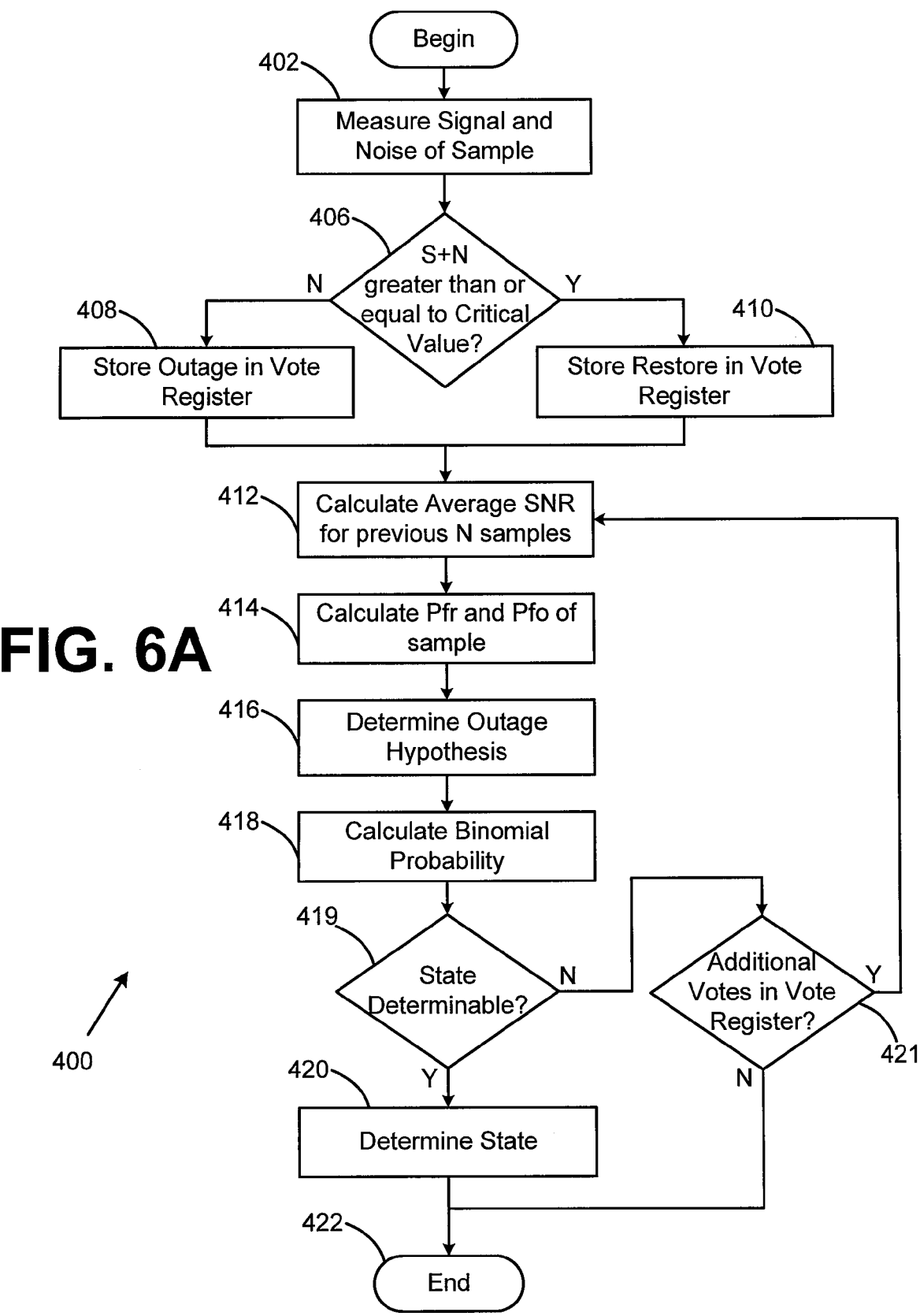
FIG. 6A depicts an exemplary embodiment of a process in accordance with the disclosure.
Figure 6B:
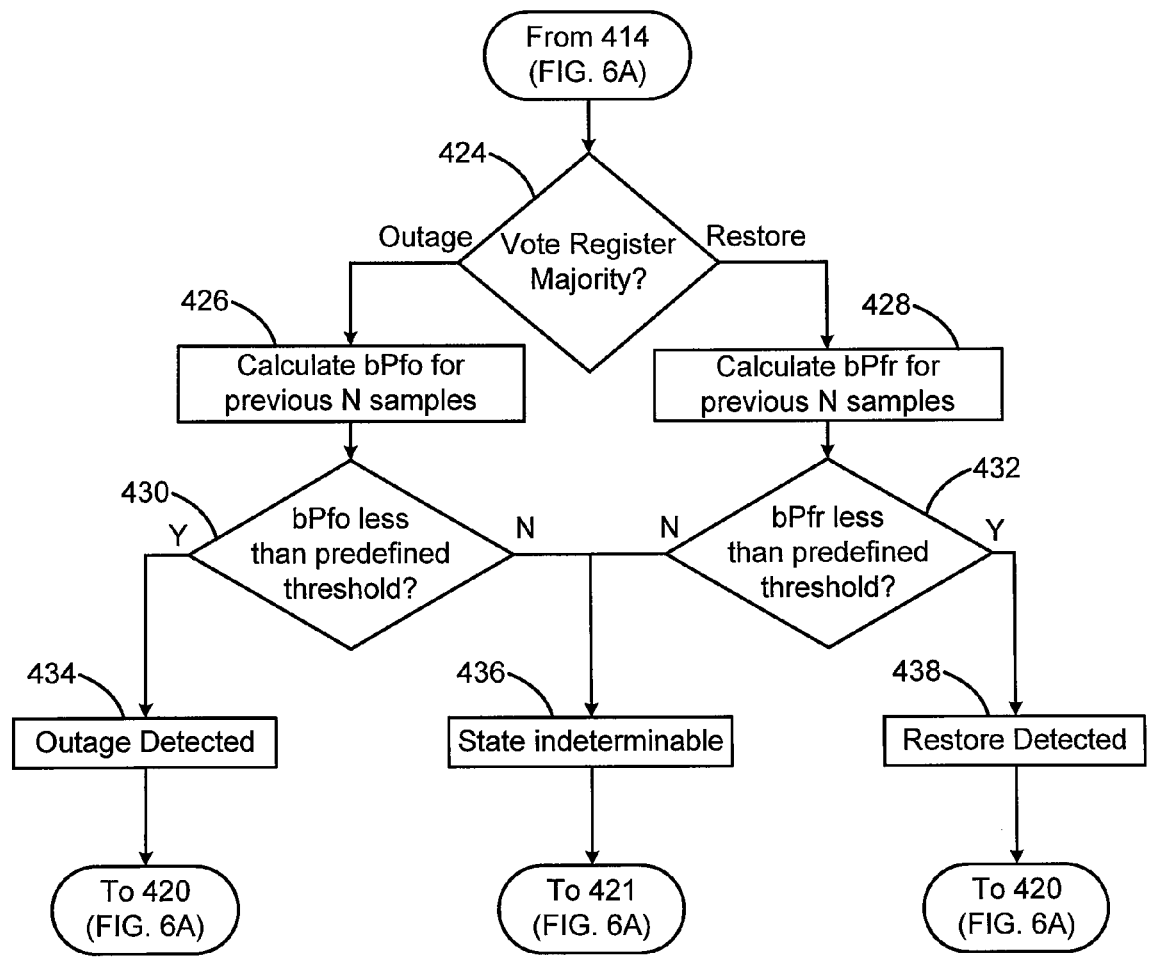
FIG. 6B depicts an exemplary embodiment of a process in accordance with the disclosure.

Reference is now made to FIGS. 6A and 6B, which depict one example of the execution of the signal outage system 300. First, in box 402 signal levels and noise levels associated with a sample on a communications link or distribution line are measured. In box 406, sum of the signal level and noise level (S+N) is compared to a critical value associated with the communications link or distribution line. If the S+N is less than the critical value, then in box 408 a value corresponding to an outage is stored in a vote register. Similarly, if the S+N is greater than or equal to the critical value, then in box 410 a value corresponding to a restore is stored within the vote register. It should be appreciated that box 406 can be implemented in various ways. As a non-limiting example, in box 408, an outage value can be stored within the vote register if the S+N is less than or equal to the critical value.

In box 412, an average SNR associated with a plurality of samples, and/or the current sample and the previous N samples, can be calculated. Next, in box 414 Pfr and/or Pfo can be calculated and/or retrieved from a memory or other storage. In box 416, an outage hypothesis can be determined on the basis of samples for which an outage or restore value is stored within the vote register. In box 418, a binomial probability of the outage hypothesis is calculated by a binomial probability analyzer. In box 419, it is determined whether it is an outage state is determinable based on one or more predefined or user specified outage thresholds. In other words, it is determined whether the calculated binomial probability meets the outage threshold. If the calculated binomial probability fails to meet a predefined or user specified outage threshold, then the depicted process returns to box 412 if in box 421 it is determined that there are unexamined votes remaining in the vote register so that a sample set of a larger number N can be examined. Similarly, if, in box 419, it is determined that an outage state is determinable, then in box 420 an outage state is determined on the basis of the calculated binomial probability and one or more predefined or user specified probability thresholds.

Reference is now made to FIG. 6B, which depicts one example of an implementation of boxes 416, 418, and 419 of FIG. 6A. As noted above, it should be appreciated that an embodiment in accordance with the disclosure can be implemented in various ways and that the exemplary embodiments disclosed herein are non-limiting. In box 424, an outage hypothesis can be generated. In the depicted example, an outage hypothesis is generated by determining whether a majority of values stored in a vote register are associated with an outage or a restore. Similarly, an outage hypothesis can be generated by determining whether a majority of other values stored within the vote register are associated with an outage or a restore. In other words, the outage hypothesis can also be generated by examining the odd or even votes stored within the vote register.

If an outage is hypothesized in box 424, then in box 426, a binomial probability of a false outage is calculated for the samples considered in making the outage hypothesis. Similarly, if a restore is hypothesized in box 424, a binomial probability of a false signal detection is calculated for the samples considered in making the outage hypothesis. If an outage is hypothesized in box 424, then in box 430 the binomial probability of a false outage detection, bPfo, is compared to a predefined or user specified probability threshold. If bPfo is less than the probability threshold, then in box 434, an outage is detected. Alternatively, if bPfo is not less than the probability threshold, then in box 436 an outage state remains unchanged. In other words, in box 436, the outage state remains unchanged because the probability of incorrectly correcting an outage is unacceptably high as determined by the predetermined or user specified probability threshold.

If a restore is hypothesized in box 424 and a probability of false signal detection, bPfr, is calculated, then in box 432 it is determined whether bPfr is less than a predetermined or user specified probability threshold. If bPfr is less than the predefined threshold, then in box 438 a signal presence, and/or a "restore," is detected. If bPfr is not less than the probability threshold, then in box 436 the outage state remains unchanged.

Figure 7:
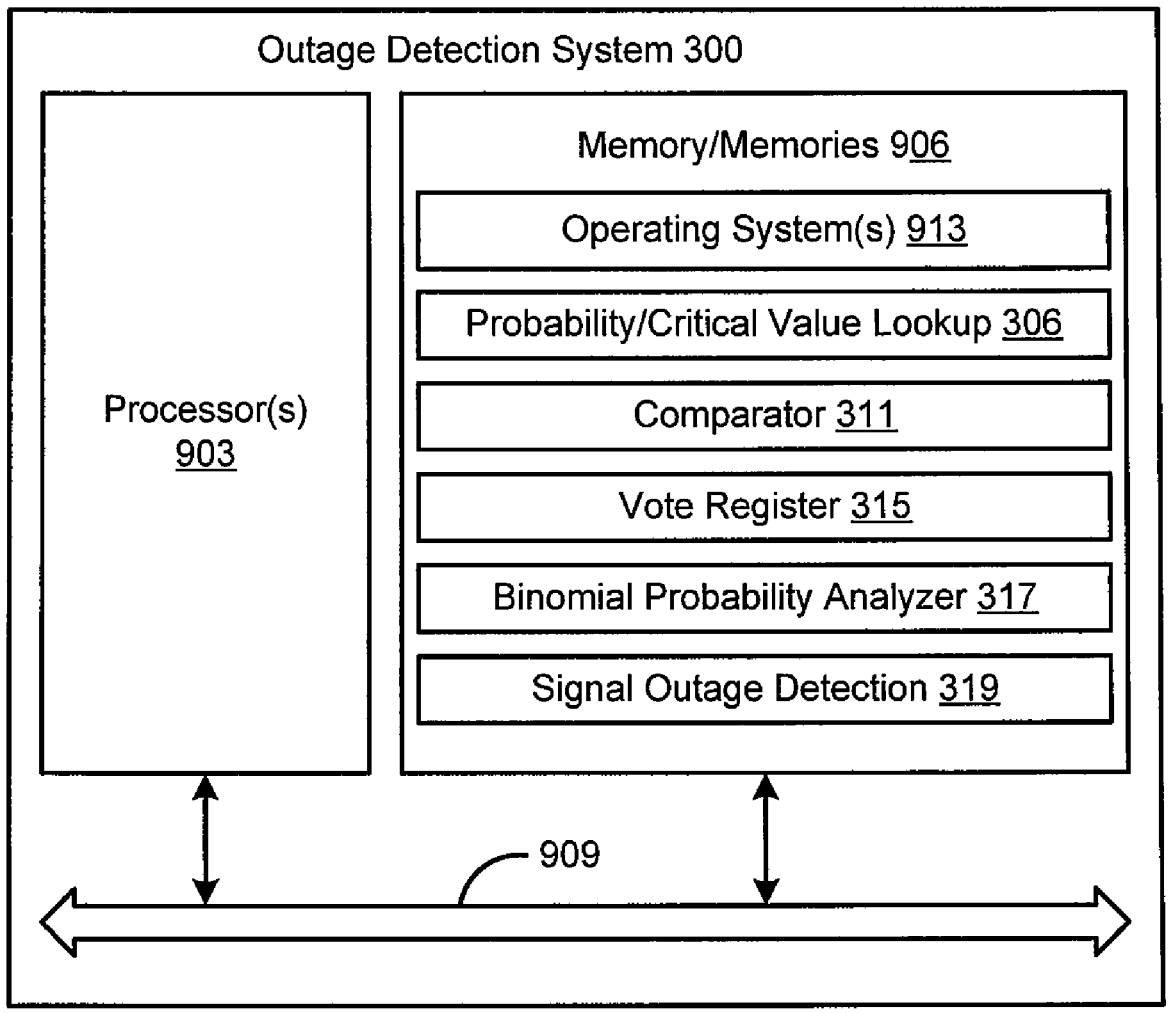
FIG. 7 depicts an exemplary embodiment of an outage detection system in accordance with the disclosure.

With reference to FIG. 7, shown is one example of an outage detection system 300 that includes an embedded system, digital signal processor, computer, and/or equivalent device according to an embodiment of the present disclosure. In implementing the above described embodiments, the outage detection system 300 may include one or more processor circuits having a processor 903 and a memory 906, both of which are coupled to a local interface 909. In this respect, the local interface 909 may comprise, for example, a data bus with an accompanying control/address bus as can be appreciated.

Stored on the memory 906 and executable by the processor 903 are various components such as a operating system 913, probability and critical value lookup 306, comparator 311, vote register 315, binomial probability analyzer 317 and signal outage detection 319. In addition, it is understood that many other components may be stored in the memory 906 and executable by the processor(s) 903. Also, such components may reside in a memory that is external from the distribution substation 103 as can be appreciated.

As set forth above, a number of components are stored in the memory 906 and are executable by the processor 903. In this respect, the term "executable" refers to a program file that is in a form that can ultimately be run by the processor 903. Examples of executable programs may be, for example, a compiled program that can be translated into machine code in a format that can be loaded into a random access portion of the memory 906 and run by the processor 903, or source code that may be expressed in proper format such as object code that is capable of being loaded into a random access portion of the memory 906 and executed by the processor 903. An executable program may be stored in any portion or component of the memory 906 including, for example, random access memory, read-only memory, a hard drive, compact disk (CD), floppy disk, or other memory components.

The memory 906 is defined herein as volatile and/or nonvolatile memory and data storage components. Volatile components are those that do not retain data values upon loss of power. Nonvolatile components are those that retain data upon a loss of power. Thus, the memory 906 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 903 may represent multiple processors and the memory 906 may represent multiple memories that operate in parallel. In such a case, the local interface 909 may be an appropriate network that facilitates communication between any two of the multiple processors, between any processor and any one of the memories, or between any two of the memories, etc. The processor 903 may be of electrical, optical, or of some other construction as can be appreciated by those with ordinary skill in the art.

The operating system 913 is executed to control the allocation and usage of hardware resources such as the memory and processing time in the server 103. In this manner, the operating system 913 serves as the foundation on which applications depend as is generally known by those with ordinary skill in the art.

The flow charts of FIGS. 6A and 6B show the functionality and operation of an implementation of the distribution substation 103. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow charts of FIGS. 6A and 6B show a specific order of execution, it is understood that the order of execution may differ from that which is depicted. For example, the order of execution of two or more blocks may be scrambled relative to the order shown. Also, two or more blocks shown in succession in FIGS. 6A and 6B may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the functionality of the disclosed systems are expressed in the form of software or code, it can be embodied in any computer-readable medium for use by or in connection with an instruction execution system such as, for example, a processor in a computer system or other system. In this sense, the functionality may comprise, for example, statements including instructions and declarations that can be fetched from the computer-readable medium and executed by the instruction execution system. In the context of the present disclosure, a "computer-readable medium" can be any medium that can contain, store, or maintain the executable software for use by or in connection with the instruction execution system.

The computer readable medium can comprise any one of many physical media such as, for example, electronic, magnetic, optical, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the functionality of various are described above with respect to FIGS. 1-6 as being embodied in software or code executed by general purpose hardware as discussed above, as an alternative the same may also be embodied in dedicated hardware or a combination of software/general purpose hardware and dedicated hardware. If embodied in dedicated hardware, the functionality of these components can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

The invention claimed is:

1. A power distribution substation, comprising:
   a signal sampler configured to sample a signal on a communications link, the signal sampler further configured to determine a noise level and a signal level of the sample and to sample a plurality of signals at predetermined intervals;
   a comparator configured to compare a critical value with a first sum of signal and noise of the sample, the critical value based upon on the signal level and the noise level and having a value substantially similar to a second sum of signal and noise at which probability density functions of false signal detection and false outage detection on the communications link are substantially similar;
   a binomial probability analyzer configured to calculate a binomial probability of false outage and a binomial probability of false signal detection of the sample and the previous N samples; and
   a vote register configured to store a vote value based upon the comparison of the first sum of signal and noise of the sample to the critical value, the vote value corresponding to whether the sample is indicative of an outage or a signal detection and the vote register configured to store a plurality of vote values corresponding to the sample and the previous N samples, wherein the vote value can be assigned a binary value corresponding to an outage or a restore.

2. A power distribution substation, comprising:
   a signal sampler configured to sample a signal on a communications link, the signal sampler further configured to determine a noise level and a signal level of the sample;
   a comparator configured to compare a critical value with a first sum of signal and noise of the sample, the critical value based upon on the signal level and the noise level and having a value substantially similar to a second sum of signal and noise at which probability density functions of false signal detection and false outage detection on the communications link are substantially similar; and
   a binomial probability analyzer configured to calculate a binomial probability of false outage of the sample and the previous N samples.

3. The power distribution substation of claim 2, wherein the binomial probability analyzer is further configured to calculate a binomial probability of false signal detection of the sample and the previous N samples.

4. The power distribution substation of claim 2, further comprising:
   a vote register configured to store a vote value based upon the comparison of the first sum of signal and noise of the sample to the critical value, the vote value corresponding to whether the sample is indicative of an outage or a signal detection and the vote register configured to store a plurality of vote values corresponding to the sample and the previous N samples.

5. The power distribution substation of claim 2, further comprising:
   a signal outage detector configured to compare the binomial probability of false outage detection to a predefined outage threshold and detect a signal outage if the binomial probability of false outage is less than the predefined outage threshold.

6. The power distribution substation of claim 5, wherein the signal outage detector is configured to compare the binomial probability of false signal detection to a predefined signal detection threshold; and
   detect a signal restore if the binomial probability of false signal detection is less than the predefined signal detection threshold.

7. The power distribution substation of claim 5, wherein the vote value can be assigned a binary value corresponding to an outage or a restore.

8. The power distribution substation of claim 5, wherein the binomial probability analyzer is further configured to retrieve:
   a plurality of probabilities of false outage, each of the probabilities corresponding to a respective one of the sample and the previous N samples; and
   calculate the binomial probability of false outage based upon a plurality of probabilities of false outage, wherein a first binomial coefficient for calculating the binomial probability of false outage includes the number of vote values in the vote register and the number K of vote values stored in the vote register indicative of an outage.

9. The power distribution substation of claim 5, further comprising:
   a critical value table, wherein the comparator is configured to retrieve the critical value from the critical value table, the critical value table further configured to store critical values according to signal to noise ratio and noise level.

10. The power distribution substation of claim 8, wherein the binomial probability analyzer is further configured to:
    retrieve a plurality of probabilities of false restore, each of the probabilities corresponding to a respective one of the sample and the previous N samples; and
    calculate the binomial probability of false restore based upon a plurality of probabilities of false restore, wherein a second binomial coefficient for calculating the binomial probability of false signal detection includes the number of vote values in the vote register and the number K of vote values stored in the vote register indicative of a restore.

11. The power distribution substation of claim 2, wherein the signal sampler is configured to sample a plurality of signals at predetermined interval.

12. A method, comprising the steps of:
    receiving in a processor based system a sample of a signal on a communications link;
    determining in a processor based system a noise level of the sample;
    determining in a processor based system a signal level of the sample;
    comparing a critical value with a first sum of the signal level and the noise level, the critical value being based upon on the signal level and the noise level and having a value substantially similar to a second sum of signal level and noise level at which probability density functions of false signal detection and false outage detection on the communications link are substantially similar; and
    calculating a binomial probability of false outage detection of the previous N samples.

13. The method of claim 12, further comprising the step of:
    calculating a binomial probability of false signal detection of the sample and the previous N samples.

14. The method of claim 12, wherein the step of comparing the critical value further comprises:

storing a vote value in a vote register based upon the comparison of the first sum of the signal level and the noise level to the critical value, the vote value corresponding to whether the sample is indicative of an outage or a signal detection and the vote register configured to store a vote value corresponding to the previous N samples.

15. The method of claim 12, further comprising the steps of:

comparing the binomial probability of false outage detection to a predefined outage threshold; and detecting a signal outage if the binomial probability of false outage is less than the predefined outage threshold.

16. The method of claim 14, further comprising the steps of:

comparing the binomial probability of false signal detection to a predefined signal detection threshold; and detecting a signal restoration if the binomial probability of false signal detection is less than the predefined signal detection threshold.

17. The method of claim 14, wherein the vote value can be assigned a binary value corresponding to an outage or a restore.

18. The method of claim 14, wherein the step of calculating the binomial probability of false outage further comprises the steps of:

retrieving a plurality of probabilities of false outage, each of the probabilities corresponding to a respective one of the sample and the previous N samples; and calculating the binomial probability of false outage based upon plurality of probabilities of false outage, wherein a first binomial coefficient for calculating the binomial probability of false outage includes the number of vote values in the vote register and the number K of vote values stored in the vote register indicative of an outage.

19. The method of claim 16, wherein a second binomial coefficient for calculating the binomial probability of false signal detection includes the number of vote values in the vote register and the number K of vote values stored in the vote register indicative of a signal detection.

20. The method of claim 12, further comprising the step of:

retrieving the critical value from a critical value table, the critical value table storing critical values according to signal to noise ratio.

21. The method of claim 12, wherein subsequent samples are received at predetermined intervals.

* * * * *